(12) United States Patent
Lucas et al.

(10) Patent No.: US 8,354,602 B2
(45) Date of Patent: Jan. 15, 2013

(54) METHOD AND SYSTEM FOR WEIGHTING MATERIAL STORAGE UNITS BASED ON CURRENT OUTPUT FROM ONE OR MORE LOAD SENSORS

(75) Inventors: Bruce C. Lucas, Marlow, OK (US); Steve Crain, Duncan, OK (US); Rebecca McConnell, Lone Grove, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 329 days.

(21) Appl. No.: 12/691,647

(22) Filed: Jan. 21, 2010

(65) Prior Publication Data

US 2011/0174551 A1 Jul. 21, 2011

(51) Int. Cl.
*G01G 19/00* (2006.01)
*G01G 3/142* (2006.01)

(52) U.S. Cl. ............... 177/132; 177/229; 177/DIG. 9

(58) Field of Classification Search .......... 177/132–136, 177/211, 229, DIG. 9
See application file for complete search history.

(56) References Cited

U.S. PATENT DOCUMENTS

| | | | |
|---|---|---|---|
| 1,730,173 A | 10/1929 | Stearns | |
| 2,590,946 A * | 4/1952 | Darling | 340/870.05 |
| 2,795,403 A | 6/1957 | Mead | 259/4 |
| 2,821,854 A | 2/1958 | Franke | 73/296 |
| 3,072,209 A * | 1/1963 | Perry, Jr. | 177/179 |
| 3,155,248 A | 11/1964 | Haller | 214/38 |
| 3,279,550 A | 10/1966 | Kersten | |
| 3,291,234 A | 12/1966 | Woodburn | 177/36 |
| 3,381,943 A | 5/1968 | Miller | 259/148 |
| 3,547,291 A | 12/1970 | Batterton et al. | 214/515 |
| 3,587,760 A | 6/1971 | Othmar et al. | |
| 3,591,147 A | 7/1971 | Anderson et al. | 259/154 |
| 3,661,220 A * | 5/1972 | Harris | 177/136 |
| 3,687,319 A | 8/1972 | Adam et al. | 214/501 |
| 3,693,083 A * | 9/1972 | Hamilton et al. | 324/98 |
| 3,792,790 A | 2/1974 | Brubaker | 214/501 |
| 3,854,540 A | 12/1974 | Holmstrom, Jr. | 177/136 |
| 3,857,452 A | 12/1974 | Hartman | 177/139 |
| 3,893,655 A | 7/1975 | Sandiford | 259/4 |

(Continued)

FOREIGN PATENT DOCUMENTS

DE 37 17 417 A1 12/1988

(Continued)

OTHER PUBLICATIONS

"Practical Strain Gage Measurements" (http://www.omega.com/techref/pdf/strainGage_Measurement.pdf), pp. 94-130, Agilent Technologies, Inc. © 1999.*

(Continued)

*Primary Examiner* — Randy W Gibson
(74) *Attorney, Agent, or Firm* — John W. Wustenberg; Baker Botts L.L.P.

(57) ABSTRACT

Methods and systems for accurate measurement of forces to determine the amount of materials in a container are disclosed. A weighing assembly is disclosed which includes a base plate, a plurality of bearing plates coupled to the base plate and a plurality of load sensors. Each of the plurality of load sensors is coupled to one of the plurality of bearing plates. A mounting block is symmetrically supported by the plurality of load sensors and a current measurement device measures a sum of currents output from the plurality of load sensors.

25 Claims, 5 Drawing Sheets

U.S. PATENT DOCUMENTS

| | | | | |
|---|---|---|---|---|
| 3,931,999 | A | 1/1976 | McCain | 302/14 |
| 3,934,739 | A | 1/1976 | Zumsteg et al. | 214/501 |
| 3,949,822 | A * | 4/1976 | English et al. | 177/126 |
| 4,020,911 | A * | 5/1977 | English et al. | 177/136 |
| 4,063,605 | A | 12/1977 | Graham | 177/225 |
| 4,095,659 | A * | 6/1978 | Blench et al. | 177/136 |
| 4,103,752 | A | 8/1978 | Schmidt | 177/141 |
| 4,163,626 | A | 8/1979 | Batterton et al. | 414/469 |
| 4,187,047 | A | 2/1980 | Squifflet | 414/332 |
| 4,203,497 | A * | 5/1980 | Harris et al. | 177/134 |
| 4,249,623 | A * | 2/1981 | McCauley | 177/136 |
| 4,249,838 | A | 2/1981 | Harvey et al. | 406/51 |
| 4,345,628 | A | 8/1982 | Campbell et al. | 141/83 |
| 4,345,872 | A | 8/1982 | Arnold | 414/705 |
| 4,411,325 | A * | 10/1983 | Hamilton | 177/136 |
| 4,411,327 | A | 10/1983 | Lockery et al. | 177/211 |
| 4,465,420 | A | 8/1984 | Dillman | 414/332 |
| 4,621,972 | A | 11/1986 | Grotte | 414/477 |
| 4,634,335 | A | 1/1987 | Van Den Pol | 414/494 |
| 4,666,003 | A * | 5/1987 | Reichow | 177/136 |
| 4,708,569 | A | 11/1987 | Nijenhuis | 414/332 |
| 4,726,435 | A | 2/1988 | Kitagawa et al. | 177/187 |
| 4,775,018 | A | 10/1988 | Kroll et al. | 177/134 |
| 4,775,275 | A | 10/1988 | Perry | 414/21 |
| 4,819,750 | A | 4/1989 | Carnevale | 177/256 |
| 4,844,189 | A | 7/1989 | Shisgal et al. | 177/211 |
| 4,913,198 | A | 4/1990 | Hayahara et al. | 141/83 |
| 4,969,112 | A * | 11/1990 | Castle | 702/173 |
| 5,044,861 | A | 9/1991 | Kirchhoff et al. | 414/332 |
| 5,127,450 | A | 7/1992 | Saatkamp | 141/9 |
| 5,133,212 | A | 7/1992 | Grills et al. | 73/296 |
| 5,161,628 | A | 11/1992 | Wirth | 177/137 |
| 5,205,370 | A | 4/1993 | Paul et al. | 177/256 |
| 5,333,695 | A | 8/1994 | Walter | 172/272 |
| 5,343,000 | A | 8/1994 | Griffen et al. | 177/145 |
| 5,452,615 | A | 9/1995 | Hilton | 73/862.043 |
| 5,546,683 | A | 8/1996 | Clark | 37/468 |
| 5,578,798 | A | 11/1996 | Nuyts | 177/136 |
| 5,600,104 | A * | 2/1997 | McCauley et al. | 177/136 |
| 5,635,680 | A | 6/1997 | Dojan | 177/136 |
| 5,637,837 | A | 6/1997 | Merz et al. | 177/145 |
| 5,650,928 | A | 7/1997 | Hagenbuch | 364/423.098 |
| 5,665,910 | A | 9/1997 | Knutson et al. | 73/200 |
| 5,717,167 | A | 2/1998 | Filing et al. | 177/136 |
| 5,752,768 | A | 5/1998 | Assh | |
| 5,764,522 | A | 6/1998 | Shalev | 700/240 |
| 5,811,737 | A | 9/1998 | Gaiski | 177/1 |
| 5,811,738 | A | 9/1998 | Boyovich et al. | 177/136 |
| 5,850,757 | A | 12/1998 | Wierenga | 73/296 |
| 5,880,410 | A | 3/1999 | Neuman | 177/187 |
| 5,884,232 | A | 3/1999 | Buder | 702/42 |
| 6,118,083 | A | 9/2000 | Boyovich et al. | 177/136 |
| 6,148,667 | A | 11/2000 | Johnson | 73/296 |
| 6,186,657 | B1 | 2/2001 | Fuchsbichler | 366/165.4 |
| 6,242,701 | B1 | 6/2001 | Breed et al. | 177/144 |
| 6,284,987 | B1 | 9/2001 | Al-Modiny | 177/170 |
| 6,313,414 | B1 | 11/2001 | Campbell | 177/16 |
| 6,384,349 | B1 | 5/2002 | Voll | 177/25.19 |
| 6,474,926 | B2 | 11/2002 | Weiss | 414/332 |
| 6,495,774 | B1 * | 12/2002 | Pederson | 177/136 |
| 6,532,830 | B1 | 3/2003 | Jansen et al. | 73/862.042 |
| 6,601,763 | B1 | 8/2003 | Hoch et al. | 235/385 |
| 6,769,315 | B2 | 8/2004 | Stevenson et al. | 73/862.629 |
| 6,919,516 | B2 * | 7/2005 | Frye et al. | 177/25.13 |
| 6,928,886 | B2 | 8/2005 | Meusel et al. | 73/862.324 |
| 6,948,535 | B2 | 9/2005 | Stegemoeller | 141/67 |
| 7,048,432 | B2 | 5/2006 | Phillippi et al. | 366/164.1 |
| 7,202,425 | B2 | 4/2007 | Knudsen et al. | 177/211 |
| 7,214,028 | B2 | 5/2007 | Boasso | 414/812 |
| 7,214,892 | B2 | 5/2007 | Williamson | 177/170 |
| 7,240,549 | B2 | 7/2007 | Kimbara et al. | 73/296 |
| 7,267,001 | B1 | 9/2007 | Stein | 73/296 |
| 7,353,875 | B2 | 4/2008 | Stephenson et al. | 166/305.1 |
| 7,528,329 | B2 | 5/2009 | Nuyts | 177/136 |
| 7,538,281 | B2 * | 5/2009 | Pottebaum et al. | 177/211 |
| 2001/0038018 | A1 | 11/2001 | Bell et al. | 222/58 |
| 2003/0047387 | A1 | 3/2003 | Bogat | 186/59 |
| 2003/0047603 | A1 | 3/2003 | Lustenberger et al. | 235/385 |
| 2003/0202869 | A1 | 10/2003 | Posch | 414/498 |
| 2004/0016576 | A1 | 1/2004 | Kuechenmeister et al. | 177/142 |
| 2005/0110648 | A1 | 5/2005 | Lehrman et al. | 340/686.1 |
| 2006/0225924 | A1 | 10/2006 | Ivan et al. | 175/66 |
| 2007/0107540 | A1 | 5/2007 | Davies | |
| 2007/0125543 | A1 | 6/2007 | McNeel et al. | 166/308.3 |
| 2007/0201305 | A1 | 8/2007 | Heilman et al. | 366/141 |
| 2008/0066911 | A1 | 3/2008 | Luharuka et al. | 166/283 |
| 2008/0271927 | A1 | 11/2008 | Crain | 177/1 |
| 2009/0107734 | A1 | 4/2009 | Lucas | 177/25.11 |

FOREIGN PATENT DOCUMENTS

| | | |
|---|---|---|
| DE | 295 18 215 U1 | 5/1996 |
| FR | 2474335 | 7/1981 |
| WO | WO 94/19263 | 9/1994 |
| WO | WO 2009/065858 | 5/2009 |

OTHER PUBLICATIONS

"The Strain Gage" (http://www.omega.com/literature/transactions/volume3/strain2.html#_top), pp. 1-6, Omega Engineering, Inc. © 2003-2012.*
International Search Report in PCT/GB2010/001717, May 10, 2011.
Office Action in U.S. Appl. No. 12/182,297, Apr. 21, 2011.
Boerger pump—available at: http://www.boerger-pumps.com/contero/gallery/Prospekte_USA/us_p_ssr_boerger_powerfeed_0309.pdf.
Office Action in U.S. Appl. No. 11/741,509, Aug. 19, 2009.
Office Action in U.S. Appl. No. 11/741,509, Jan. 28, 2010.
Office Action in U.S. Appl. No. 11/930,756, Mar. 18, 2009.
Office Action in U.S. Appl. No. 11/930,756, Jul. 7, 2009.
Office Action in U.S. Appl. No. 11/930,756, Jan. 28, 2010.
Advisory Action in U.S. Appl. No. 11/930,756, Mar. 31, 2010.
Office Action in U.S. Appl. No. 12/435,551, Jun. 15, 2011.
International Search Report for Application No. PCT/GB2010/000512, Jun. 25, 2010.
International Search Report in PCT/GB2011/000071, Mar. 21, 2011.
Office Action issued in U.S. Appl. No. 12/235,270, Mar. 4, 2011.
Office Action in U.S. Appl. No. 12/422,450, Jun. 18, 2010.
Office Action in U.S. Appl. No. 12/635,009 dated Jul. 23, 2012.
Fenna et al., "Dictionary of Weights, Measures, and Units," Oxford University Press, 2002, pp. I, 65 and 66.
Kutz et al., "Mechanical Engineers' Handbook," 2nd Ed., 1998, pp. I, II, and 1332.
Abulnaga, "Slurry Systems Handbook," 2002, pp. I, II, and 1.20.
Communication from European Patent Office in EEHC/SJW/N28306 dated Aug. 31, 2012.

\* cited by examiner

METHOD AND SYSTEM FOR WEIGHTING MATERIAL STORAGE UNITS BASED ON CURRENT OUTPUT FROM ONE OR MORE LOAD SENSORS

BACKGROUND

The present invention relates generally to monitoring the amount of materials, and more particularly, to methods and systems for accurate measurement of forces to determine the amount of materials in a container.

Materials that are used in industrial operations are often stored in containers before being mixed together to create a desired mixture. For instance, storage containers are frequently used in industries such as agriculture, pharmaceuticals and oil field applications. For example, in oil field operations fluids are often stored in containers before being discharged into a blender or being pumped down hole. The containers used are often mounted on vehicles and are transportable. In some applications, the materials used in oil field operations are stored in a multiple compartment storage unit such as a Mountain Mover available from Halliburton Energy Services, Inc., of Duncan, Okla.

It is often desirable to accurately monitor the amount of materials stored in a container. Additionally, in instances where material is being discharged from a container, it is desirable to monitor the rate at which material is being discharged, both to maintain the necessary inventory and to ensure that the correct amount of material is being discharged. However, the materials used are often hazardous or not environmentally friendly making their exposure undesirable. Moreover, space is often limited giving rise to a need for a material monitoring system and method with minimal space and equipment requirements.

FIGURES

Some specific example embodiments of the disclosure may be understood by referring, in part, to the following description and the accompanying drawings.

Figure 1:
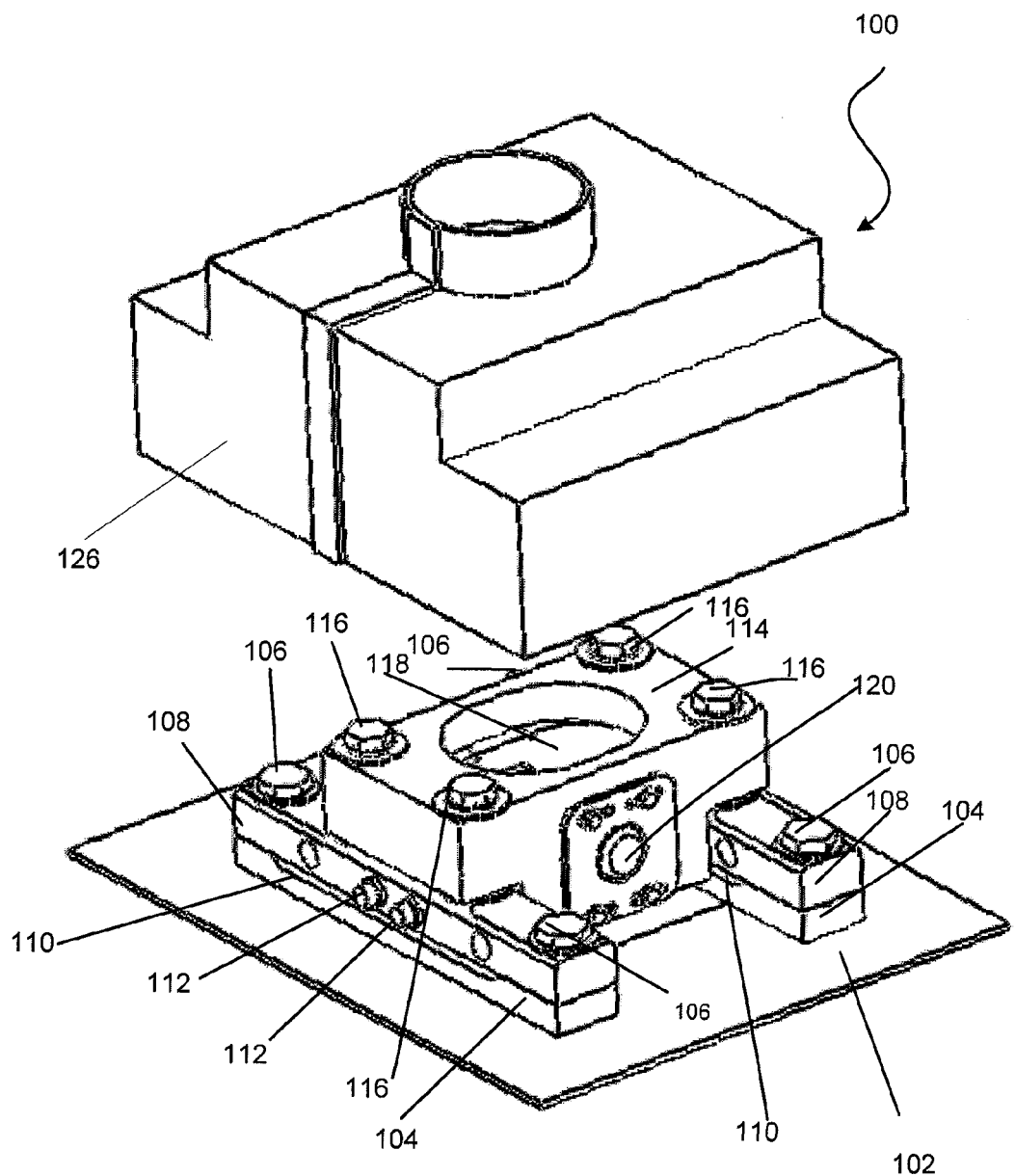
FIG. 1 is a perspective view of a weighing assembly in accordance with an exemplary embodiment of the present invention.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

SUMMARY

The present invention relates generally to monitoring the amount of materials, and more particularly, to methods and systems for accurate measurement of forces to determine the amount of materials in a container.

In one exemplary embodiment, the present invention is directed to a weighing assembly comprising: a base plate; a first bearing plate and a second bearing plate coupled to the base plate; a first load sensor coupled to the first bearing plate and a second load sensor coupled to the second bearing plate; and a mounting block; wherein there is a gap between a portion of the first load sensor and a portion of the first bearing plate; wherein there is a gap between a portion of the second load sensor and a portion of the second bearing plate; wherein a first portion of the mounting block is coupled to the first load sensor; wherein a second portion of the mounting block is coupled to the second load sensor; wherein each of the first load sensor and the second load sensor includes a first electrical connector and a second electrical connector; wherein the first electrical connector of the first load sensor is connected to the first electrical connector of the second load sensor; wherein the second electrical connector of the first load sensor is connected to a power supply; and wherein a sum of currents output from the first load sensor and the second load sensor indicates a force applied to the mounting block.

In another exemplary embodiment, the present invention is directed to a method of weighing a container comprising: providing a container having a plurality of standing legs; providing a plurality of weighing assemblies, each of the plurality of weighing assemblies comprising: a base plate; a first bearing plate and a second bearing plate coupled to the base plate; a first load sensor coupled to the first bearing plate and a second load sensor coupled to the second bearing plate; a mounting block resting on the first load sensor and the second load sensor; wherein a sum of current outputs from the first load sensor and the second load sensor indicates amount of force applied to the mounting block; coupling each of the plurality of standing legs to the mounting block of one of the plurality of weighing assemblies; determining the weight of the container by summing the amount of force applied to the mounting block of each of the plurality of weighing assemblies.

In another exemplary embodiment, the present invention is directed to a weighing assembly comprising: a base plate; a plurality of bearing plates coupled to the base plate; a plurality of load sensors; wherein each of the plurality of load sensors is coupled to one of the plurality of bearing plates; a mounting block symmetrically supported by the plurality of load sensors; and a current measurement device for measuring a sum of currents output from the plurality of load sensors.

The features and advantages of the present disclosure will be readily apparent to those skilled in the art upon a reading of the description of exemplary embodiments, which follows.

DESCRIPTION

The present invention relates generally to monitoring the amount of materials, and more particularly, to methods and systems for accurate measurement of forces to determine the amount of materials in a container.

Turning now to FIG. 1, a weighing assembly in accordance with an exemplary embodiment of the present invention is denoted generally with reference numeral 100. The weighing assembly 100 includes a base plate 102. The base plate 102 may be coupled to a surface or platform on a structure on which the container (not shown) whose weight is to be monitored is to be positioned. As would be apparent to those of ordinary skill in the art, with the benefit of this disclosure, in one embodiment, the base plate 102 may be integrally formed with the surface or platform. In one exemplary embodiment, the base plate 102 of the weighing assembly 100 may be welded in place. Bearing plates 104 are coupled to the base plate 102. In one exemplary embodiment, the bearing plates 104 may be coupled to the base plate 102 by a welded connection. Although welded connections are used in the exemplary embodiment, as would be appreciated by those of ordinary skill in the art, any suitable fastener may be used to couple the bearing plates 104 to the base plate 102. For example, in another exemplary embodiment, bolts may be used to couple the bearing plates 104 to the base plate 102.

Identical load sensors 108 rest on each bearing plate 104. Each load sensor 108 is coupled to a bearing plate 104 at its two lateral ends. In one exemplary embodiment, the bearing plates 104 may be threaded and a first bolted connection 106 may couple the bearing plates 104 to the load sensors 108. Although bolted connections 106 are used in the exemplary embodiment, as would be appreciated by those of ordinary skill in the art, any suitable fastener may be used to couple the bearing plates to the load sensors. Moreover, in one embodiment, a first fastener may be used to couple the bearing plates 104 to the base plate 102 and a second fastener may be used to couple the load sensors 108 to the bearing plates 104.

In one exemplary embodiment, load cells may be used as load sensors. Electronic load cells are preferred for their accuracy and are well known in the art, but other types of force-measuring devices may also be used. As will be apparent to one skilled in the art, however, any type of load-sensing device can be used in place of or in conjunction with a load cell. Examples of suitable load-measuring devices include weight-, mass-, pressure- or force-measuring devices such as hydraulic load cells, scales, load pins, dual shear beam load cells, strain gauges and pressure transducers. Standard load cells are available in various ranges such as 0-5000 pounds, 0-10000 pounds, etc.

There is a gap 110 between the middle portion of the load sensors 108 and the middle portion of the bearing plates 104. The gap 110 allows the load sensors 108 to move up or down in response to the application of forces to the load sensors 108. Each load sensor 108 includes electrical connectors which will be discussed in more detail below, in conjunction with FIG. 3. A mounting block 114 is placed on the load sensors 108. In the exemplary embodiment, the mounting block 114 is mounted on the load sensors 108 such that all the vertical force applied to the mounting block 114 is sensed by the load sensors 108. In one exemplary embodiment, the mounting block 114 may be coupled to the load sensors 108 by a second set of bolted connections 116.

The mounting block 114 includes a receiving portion 118 for receiving the leg of the container (not shown) that is to be monitored. In one exemplary embodiment, the receiving portion 118 may be elliptical. The receiving portion 118 may include a receiving rod 120 which may be operable to mate with a corresponding mating portion at the bottom of the leg of the container (not shown) that is to be monitored. Accordingly, the weight of the container is transferred through the container leg (not shown), the receiving rod 120 and the mounting block 114 to the load sensors 108.

The receiving rod 120 may be mated to the mounting block 114 with a pin trap 122. The pin trap 122 may be a flat metal plate with a hole for the receiving rod 120 and slots for securing the pin trap 122 to the mounting block 114 with bolting connections 124. The slots allow flexibility in positioning or mating the receiving rod 120 relative to the mounting block 114.

As would be appreciated by those of ordinary skill in the art, with the benefit of this disclosure, each load sensor 108 will produce a current which indicates the force incident on that load sensor from the mounting block 114. The load sensors 108 are physically and electrically combined to measure the force from a support leg of the container being monitored and provide a single scalar output representing that force. The symmetrical arrangement of the load sensors 108 in the weighing assembly 100 cancels the majority of off axis force contributions from moments, torques, vibration and/or actual off axis forces within the weighing assembly. Accordingly, a fixed assembly is provided without requirements for multiple degrees of freedom or checking requirements. As would be appreciated by those of ordinary skill in the art, with the benefit of this disclosure, the weighing assembly 100 may be scalable for particular applications such as, for example, 0-150,000 pound capacity.

As would be appreciated by those of ordinary skill in the art, the weighing assembly 100 may include a cover 126 to prevent ice, dirt, debris and other materials from entering the gap between the load sensor 108 and the bearing plate 104. As would be apparent to those of ordinary skill in the art, with the benefit of this disclosure, presence of such materials in the gap 110 may lead to errors in the force measurements obtained from the load sensors 108. Accordingly, the use of a cover 126 further improves the system's accuracy.

Figure 2:
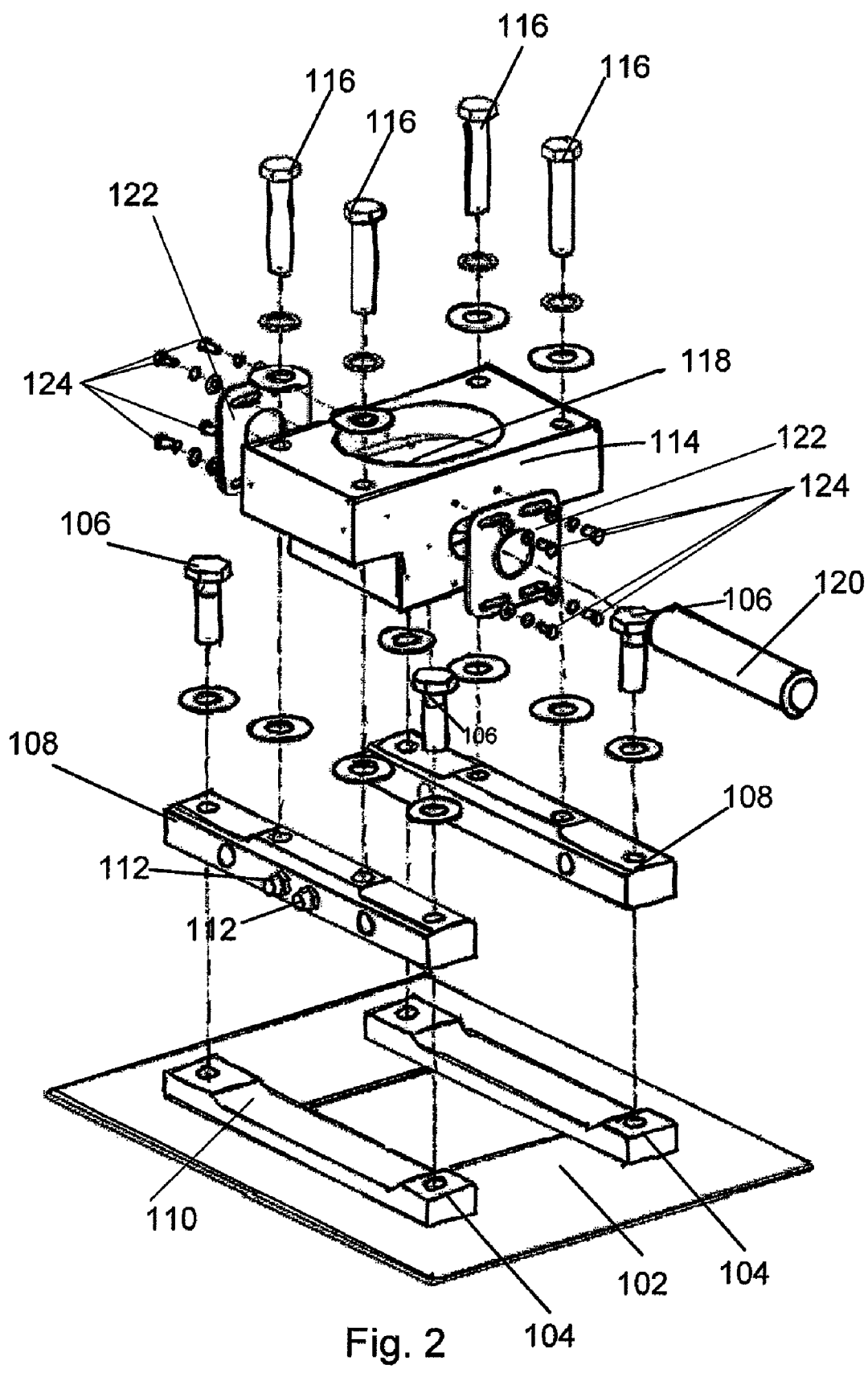
FIG. 2 is an exploded view of the weighing assembly of FIG. 1.

FIG. 2 is an exploded view of the weighing assembly of FIG. 1 depicting the base plate 102, the bearing plates 104, the first set of connecting bolts 106, the load sensors 108, the mounting block 114, the second set of connecting bolts 116, the receiving rod 120, the pin trap 122, and the third set of connecting bolts 124.

Figure 3:
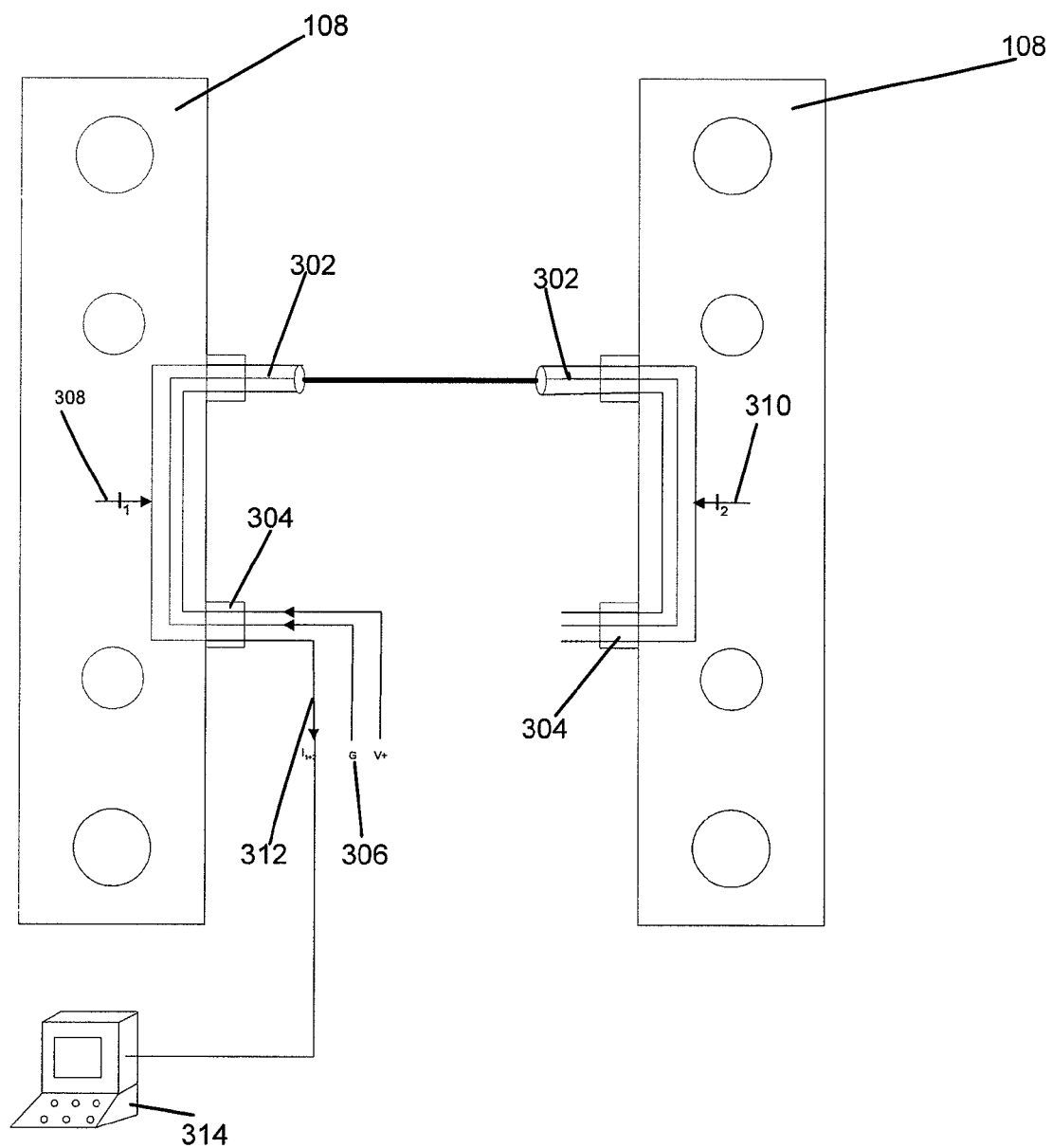
FIG. 3 is a schematic view of the load sensors and electrical connectors of the weighing assembly of FIG. 1.

FIG. 3 depicts the schematics of the load sensors 108 of the weighing assembly 100 of FIGS. 1 and 2. As depicted in FIG. 3, the weighing assembly 100 is designed to substantially simultaneously combine the signals from the individual load sensors 108 so that errors from applied moments are eliminated or significantly reduced. Specifically, by substantially simultaneously summing the currents from load sensors that may be symmetrically arranged, the present invention eliminates typical errors such as those resulting from vibration effects. As shown in FIG. 3, each load sensor 108 has a first electrical connector 302 and a second electrical connector 304. The first electrical connectors 302 of the two load sensors 108 are connected to each other and the second electrical connector 304 of one load sensor 108 is connected to a power supply (not shown) which includes a ground connection 306. The second electrical connector 304 of the second load sensor 108 may be left open or may be connected to the first electrical connector 302 of another load sensor 108 to provide additional capacity.

Accordingly, the current output 308 from the first load sensor 108 is combined with the current output 310 from the second load sensor 108 to produce a single current output 312 using Kirchhoff's Current Law. This single output may be measured by a current measurement device and is representative of the force incident on all the load sensors used in a particular weighing assembly 100. Moreover, the use of current outputs minimizes system susceptibility to electrical noise. As would be appreciated by those of ordinary skill in the art, with the benefit of this disclosure, in one exemplary embodiment, the current output may be measured using an ammeter (not shown). Moreover, as would be apparent to those of ordinary skill in the art, with the benefit of this disclosure, the present invention is not limited by the number of load sensors used and any desirable number of load sensors may be chained together in a similar fashion to obtain measurements in accordance with an embodiment of the present invention.

As would be appreciated by those of ordinary skill in the art, with the benefit of this disclosure, although the exemplary embodiment includes two load sensors, the present invention is not limited to any particular number of load sensors and any number of load sensors may be used to carry out the present invention. For instance, in another embodiment, the weighing assembly may include four load sensors, symmetrically arranged under the mounting block. In each instance, the total current output from the weighing assembly may be scaled to fall within a desired range in order to determine the total force on the particular weighing assembly.

Therefore, in accordance with an embodiment of the present invention, the readings from two or more load sensors may be combined into a single output which minimizes cost and complexity of the electronics necessary to process the signals received. Additionally, because the readings of the load sensors 108 are combined in real time, the present invention provides a cancellation of applied moments and errors from transient loads such as wind loads, off axis forces, or vibrations that result from not sampling all load sensors substantially simultaneously.

Specifically, in an exemplary embodiment, the current from each of the two load sensors 108 may be 2 [mA] when there is no load applied and the current may be 10 [mA] when a full load is applied. In this exemplary embodiment, the range of total current readings from the weighing assembly is between 4 [mA] in instances when there is no load applied to the system and 20 [mA] when a full load is applied. Accordingly, the force applied to the weighing assembly 100 may be determined for any given value of the total current 312. As would be appreciated by those of ordinary skill in the art, with the benefit of this disclosure, any number of load sensors may be used with the total current scaled to fit within the desired range.

In one exemplary embodiment, the scalar output from a weighing assembly 100 may be connected to an information handling system 314. As would be apparent to those of ordinary skill in the art, with the benefit of this disclosure, the information handling system 314 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the information handling system 314 may be a network storage device, or any other suitable device and may vary in size, shape, performance, functionality, and price. Moreover, the weighing assembly 100 may be communicatively coupled to the information handling system 314 through a wired or wireless connection. Specifically, as would be appreciated by those of ordinary skill in the art, with the benefit of this disclosure, a signal processing system may be used to process and transmit the signals from the weighing assembly 100 to the information handling system 314.

Figure 4:
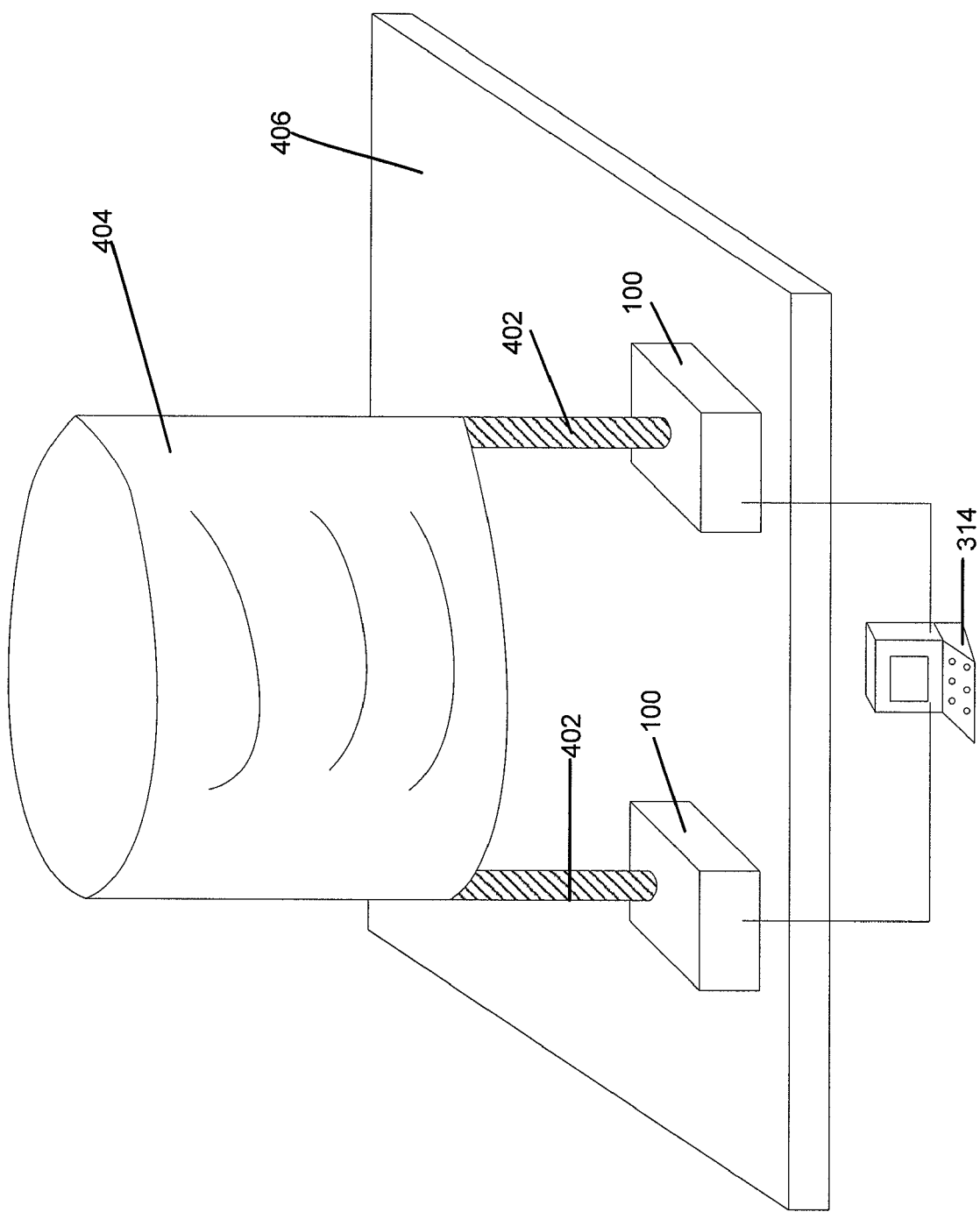
FIG. 4 is a weighing system for monitoring a container in accordance with an exemplary embodiment of the present invention.

As shown in FIG. 4, a separate weighing assembly 100 may be used for each leg of the container 404 allowing for a group of weighing assemblies 100 to support the entire weight of the container 404. Specifically, each leg 402 of a container 404 may rest in a weighing assembly 100 in accordance with an embodiment of the present invention. In one embodiment as depicted in FIG. 4, the weighing assembly 100 may be enclosed in a cover.

The base plate 102 of each weighing assembly 100 in FIG. 4 is coupled to the surface 406 on a structure on which the container 404 rests. For instance, the weighing assemblies 100 disclosed herein may be coupled to a surface 406 on a mobile platform such as a truck, a trailer, a train, a barge, a ship, a plane or any other vehicle where it is desirable to monitor the amount of materials in a container. Additionally, the weighing assembly 100 may be used on non-mobile platforms where it is desirable to monitor the amount of materials, such as, for example, a concrete pad, a metal frame, or a metal pad. Accordingly, the sum of the weight measurements at each weighing assembly 100 may be used to determine the weight of the container 404.

Although FIG. 4 depicts a container with 2 standing legs and utilizes two weighing assemblies 100, as would be appreciated by those of ordinary skill in the art, with the benefit of this disclosure, containers having any number of standing legs may be monitored using additional weighing assemblies 100. For instance, in one embodiment, the container may have four standing legs and four weighing assemblies may be utilized. For a system with four weighing assemblies 100, the capacity would be four times the capacity of the individual weighing assemblies 100. For example, if the individual weighing assemblies 100 have a range of 0-150,000 pounds, assuming a symmetrical weight distribution between the weighing assemblies 100, a total container weight of 0-600,000 pounds may be monitored.

When using multiple weighing assemblies 100 to monitor a container 404, the scalar output from the multiple weighing assemblies 100 may be substantially simultaneously combined in real time to monitor the system as a whole. Additionally, because the readings of the weighing assemblies 100 are combined in real time, the present invention provides a cancellation of applied moments and errors from transient loads such as wind loads that result from not sampling all weighing assemblies simultaneously. In one exemplary embodiment, the outputs from one or more of the disclosed weighing assemblies 100 may then be communicated to an information handling system 314 to weigh a multiple compartment storage unit such as a Mountain Mover.

In this embodiment, the information handling system 314 may store the tare weight of the storage unit being monitored based on the sum of the weights at each weighing assembly 100. As material is added to or removed from the storage unit, the output of the load sensors 108 of each weighing assembly 100 will increase or decrease respectively. The information handling system 314 may then monitor the weight measured at each weighing assembly 100 and determine the weight of the material being added to or removed from the container 404, by summing the weight measurements at all the weighing assemblies 100 coupled to the legs of that particular container 404. Specifically, the weight of the material may be determined by subtracting the tare weight of the container 404 from the total weight of the container 404 with the materials contained therein. Moreover, by continuously monitoring the weight of the material in the container 404 the mass flow rate to or from the container 404 may be determined using the gravitational constant, g. Using the mass flow rate, for a material with a known density the volumetric flow rate may be determined.

Figure 5:
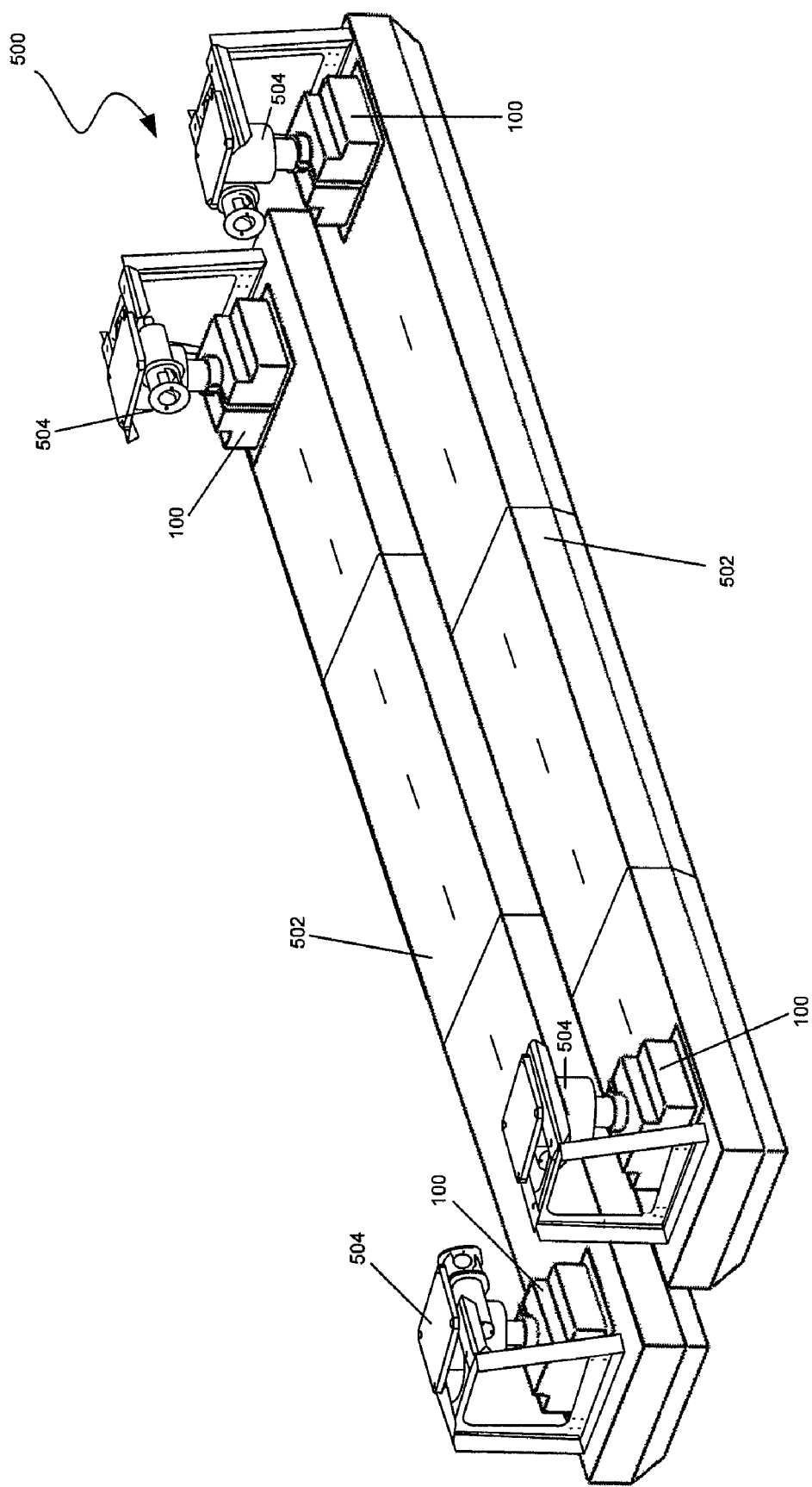
FIG. 5 is a weighing system for monitoring a container in accordance with another exemplary embodiment of the present invention.

FIG. 5 depicts a weighing system in accordance with another exemplary embodiment of the present invention, denoted generally with reference numeral 500. The weighing system 500 includes two pontoons 502. Each pontoon 502 is equipped with two weighing assemblies 100, one at each lateral end. As depicted in FIG. 5, in one embodiment the weighing assemblies 100 may be covered. As would be appreciated by those of ordinary skill in the art, the number of pontoons 502 as well as the number and placement of the weighing assemblies 100 on each pontoon 502 may be altered to meet user's requirements.

Standing legs 504 are coupled to each weighing assembly 100 in the manner described in more detail in conjunction with FIGS. 1 and 2 above. Each standing leg 504 may include a flat plate on which a container to be monitored (not shown) may rest. As would be appreciated by those of ordinary skill in the art, with the benefit of this disclosure, a user may lower the pontoons 502 or raise them, for instance, when relocating the container from one location to another. Specifically, the pontoons 502 may be lowered and be placed on a desirable surface such as the ground. Alternatively, the pontoons 502 may be raised while the container is relocated. In one embodiment, the standing legs 504 may be extendable through the container and be operable to lower and raise the pontoon 502. Specifically, a user may need to retract the standing legs 504 to raise the pontoon 502 and extend the standing legs 504 to lower the pontoon 502.

The use of the weighing assembly 100 of the present invention in conjunction with the weighing system 500 of FIG. 5 provides several advantages. Typically, the standing legs 504 of a pontoon 502 are lowered or raised one at a time. Accordingly, the pontoon 502 will often be in a sloped position during relocation. As depicted in more detail in FIGS. 1 and 2, the receiving portion 118 of the mounting block 114 which houses the standing legs 504 is elliptical in shape. The elliptical shape of the receiving portion 118 allows the standing legs 504 to tilt relative to the pontoon 502, making it easier to raise/lower the pontoon 502 one leg at a time. Moreover, the slots on the pin trap 122 are arranged to allow two degrees of freedom for the receiving rod 120 to articulate and to translate as the standing legs 504 are lowered or raised. Additionally, the slots on the pin trap 122 are designed to make the pin trap 122 adjustable, thereby permitting the accommodation of variations in leg positions from fabrication tolerances.

Accordingly, as would be apparent to those of ordinary skill in the art, with the benefit of this disclosure, the system and methods disclosed herein may be used to maintain the necessary inventory and/or perform quality control to ensure that the material is supplied to or discharged from the storage unit at the desired rate. Moreover, as would be appreciated by those of ordinary skill in the art, with the benefit of this disclosure, with an appropriate control system, the present invention may be used to provide electronic feedback for closed-loop controlled metering of the material at a desired rate. In one exemplary embodiment a threshold value for the mass, volume, mass flow rate and/or volumetric flow rate of the materials in a container may be stored in the information handling system 314. The information handling system 314 may then alert the user if the mass, volume, mass rate and/or volumetric flow rate of the materials in the container fall below or exceeds that threshold value. Stated otherwise, the information handling system 314 may alert a user of any deviations from a desired value.

In one exemplary embodiment, the weighing assembly 100 may be used in conjunction with a multiple compartment storage unit. Each leg of a multiple compartment storage unit is coupled to a weighing assembly 100. The load sensor readings from the weighing assembly at each leg of the multiple compartment storage unit is then used to determine the tare weight of the storage unit. The tare weight of the multiple compartment storage unit may be stored in an information handling system, and the materials to be stored or metered may be added to the multiple compartment storage unit.

As would be appreciated by those of ordinary skill in the art, with the benefit of this disclosure, the weighing assembly disclosed herein has a wide range of applications. For instance, the weighing assembly may be used in conjunction with monitoring multiple compartment storage units and fluid storage units as well as vertical bins used to store solid materials such as sand and cement.

Although the weighing assembly disclosed herein is discussed in conjunction with vehicles used in oil field applications, as would be apparent to those of ordinary skill in the art, with the benefit of this disclosure, the weighing assembly disclosed herein may be used in conjunction with any application where it is desirable to monitor the amount of materials in a container.

As would be appreciated by those of ordinary skill in the art, with the benefit of this disclosure, in order to prevent distortions resulting from changes in temperature, the base plate, the bearing plates, the load sensors and the mounting block used in a weighing assembly are desirably made from materials having predetermined thermal coefficients. For example, in one embodiment, the bearing plate may be made from 1018 CR Steel and the load sensors may be made from 4142 Steel. In that exemplary embodiment, the mounting block may be made from 4340 steel and the base plate may be made from HSLA Steel Plate (ASTM A514) which has nearly the same temperature expansion coefficients as the bearing plate and load sensor materials, minimizing stresses from thermal loads.

Therefore, the present invention is well-adapted to carry out the objects and attain the ends and advantages mentioned as well as those which are inherent therein. While the invention has been depicted and described by reference to exemplary embodiments of the invention, such a reference does not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects. The terms in the claims have their plain, ordinary meaning unless otherwise explicitly and clearly defined by the patentee.

What is claimed is:

1. A weighing assembly comprising:
a base plate;
a first bearing plate coupled to the base plate and a second bearing plate coupled to the base plate;
a first load sensor coupled to the first bearing plate and a second load sensor coupled to the second bearing plate; and
a mounting block;
wherein there is a gap between a portion of the first load sensor and a portion of the first bearing plate;
wherein there is a gap between a portion of the second load sensor and a portion of the second bearing plate;
wherein a first portion of the mounting block is coupled to the first load sensor;
wherein a second portion of the mounting block is coupled to the second load sensor;
wherein the first load sensor includes a first electrical connector and a second electrical connector;
wherein the second load sensor includes a first electrical connector and a second electrical connector;
wherein the first electrical connector of the first load sensor is connected to the first electrical connector of the second load sensor;
wherein current flows from the first electrical connector of the second load sensor to the first electrical connector of the first load sensor;

wherein the second electrical connector of the first load sensor is connected to a power supply; and wherein a sum of currents output from the first load sensor and the second load sensor flows through the second electrical connector of the first load sensor; and wherein the sum of currents indicates amount of force applied to the mounting block.

2. The weighing assembly of claim 1, wherein the load sensor is a load cell.

3. The weighing assembly of claim 1, wherein the weighing assembly is on one of a mobile platform and a non-mobile platform.

4. The weighing assembly of claim 3, wherein the non-mobile platform is selected from the group consisting of a concrete pad, a metal frame, and a metal pad.

5. The weighing assembly of claim 3, wherein the mobile platform is selected from the group consisting of a trailer, a truck, a train, a ship, a barge, and a plane.

6. The weighing assembly of claim 3, wherein the base plate is coupled to one of the mobile platform and the non-mobile platform.

7. The weighing assembly of claim 1, wherein the mounting block comprises a receiving portion for receiving a leg of a container.

8. The weighing assembly of claim 1, wherein the first load sensor and the second load sensor symmetrically support the mounting block.

9. The weighing assembly of claim 1, further comprising a measurement device for determining the sum of currents output from the first load sensor and the second load sensor.

10. The weighing assembly of claim 9, further comprising an information handling system communicatively coupled to the measurement device, wherein the information handling system is operable to process information received from the measurement device.

11. The weighing assembly of claim 10, wherein the information handling system is communicatively coupled to the measurement device through one of a wired network or a wireless network.

12. A method of weighing a container comprising:
providing a container having a plurality of standing legs;
providing a plurality of weighing assemblies, each of the plurality of weighing assemblies comprising:
a base plate;
a first bearing plate coupled to the base plate and a second bearing plate coupled to the base plate;
a first load sensor having a first electrical connector and a second electrical connector coupled to the first bearing plate and a second load sensor having a first electrical connector and a second electrical connector coupled to the second bearing plate;
a mounting block resting on the first load sensor and the second load sensor;
wherein current flows from the first electrical connector of the second load sensor to the first electrical connector of the first load sensor,
wherein the second electrical connector of the first load sensor is connected to a power supply, and
wherein a sum of current outputs from the first load sensor and the second load sensor flows through the second electrical connector of the first load sensor, and wherein the sum of current outputs indicates amount of force applied to the mounting block;
coupling each of the plurality of standing legs to the mounting block of one of the plurality of weighing assemblies;
determining the weight of the container by summing the amount of force applied to the mounting block of each of the plurality of weighing assemblies.

13. The method of claim 12, wherein the step of determining the weight of the container comprises:
measuring the sum of current outputs from the first load sensor and the second load sensor of each of the plurality of weighing assemblies.

14. The method of claim 13, further comprising communicating the measurement of the sum of current outputs from the first load sensor and the second load sensor of each of the plurality of weighing assemblies to an information handling system.

15. The method of claim 14, wherein the information handling system is operable to process the sum of current outputs from the first load sensor and the second load sensor of each of plurality of weighing assemblies to determine parameters selected from the group consisting of: the weight of the container, mass of a material in the container, mass flow rate of a material in the container; volume of material in the container, the volumetric flow rate of a material in the container and a combination thereof.

16. The method of claim 12, wherein each of the first load sensor and the second load sensor is a load cell.

17. The method of claim 12, further comprising determining parameters selected from the group consisting of weight of material in the container, mass of material in the container, mass flow rate of material in the container, volumetric flow rate of material in the container and a combination thereof.

18. The method of claim 17, further comprising alerting a user if one or more of the determined parameters deviates from a threshold value.

19. The method of claim 12, wherein the first load sensor and the second load sensor are symmetrically located with respect to the mounting block.

20. A weighing assembly comprising:
a base plate;
a plurality of bearing plates coupled to the base plate;
a plurality of load sensors;
wherein each of the plurality of load sensors is coupled to one of the plurality of bearing plates;
wherein each of the plurality of load sensors comprises a first electrical connector and a second electrical connector;
wherein current flows from the first electrical connector of a second one of the plurality of load sensors to the first electrical connector of a first one of the plurality of load sensors;
a mounting block symmetrically supported by the plurality of load sensors; and
a current measurement device for measuring a sum of currents output from the plurality of load sensors.

21. The weighing assembly of claim 20, wherein the currents output from the plurality of load sensors are measured substantially simultaneously.

22. The weighing assembly of claim 20, wherein the sum of currents output from the plurality of load sensors indicates total force applied to the mounting block.

23. The weighing assembly of claim 20, further comprising an information handling system; wherein the sum of currents output from the plurality of load sensors is communicated from the current measurement device to the information handling system.

24. The weighing assembly of claim 20, wherein the current measurement device communicates with the information handling system through one of a wired or a wireless connection.

25. The weighing assembly of claim 20 further comprising a cover; wherein the cover encloses the base plate, the plurality of bearing plates, and the plurality of load sensors.

* * * * *